United States Patent [19]
Wilson

[11] 3,766,042
[45] Oct. 16, 1973

[54] CORROSION RATEMETER

[75] Inventor: Homer M. Wilson, Houston, Tex.

[73] Assignee: Petrolite Corporation, St. Louis, Mo.

[22] Filed: Oct. 6, 1972

[21] Appl. No.: 295,629

[52] U.S. Cl. .......................... 204/195 C, 324/71 R
[51] Int. Cl. .......................................... G01n 27/46
[58] Field of Search ....................... 204/195 C, 1 T; 324/71 R

[56] References Cited
UNITED STATES PATENTS

| | | | |
|---|---|---|---|
| 3,406,101 | 10/1968 | Kilpatrick | 204/1 T |
| 3,616,417 | 10/1971 | Wilson | 204/195 C |
| 3,661,750 | 5/1972 | Wilson | 204/195 C |
| 3,661,751 | 5/1972 | Wilson | 204/195 C |
| 3,717,566 | 2/1973 | Wilson | 204/195 C |

*Primary Examiner*—G. L. Kaplan
*Attorney*—Emil J. Bodnar et al.

[57] ABSTRACT

A corrosion ratemeter with test specimen, reference and third electrodes contactable by a corrodant. A differential amplifier connects to a direct current supply means including circuit common. The amplifier has a first input connected to the reference electrode, and a second input connected through a circuit means to the test specimen electrode, and an output connected to the third electrode. Second amplifier means connected to the test specimen electrode and circuit common for adjusting the circuit common to zero potential difference relative to the test specimen electrode thereby completing a current loop circuit from the output of the differential amplifier, between the test specimen and third electrodes, and circuit common. Readout means measure the output current in the current loop which creates a polarization potential between the reference and test specimen electrodes. Switching means also permit measurement of the freely corroding potential between the reference and test specimen electrodes.

12 Claims, 1 Drawing Figure

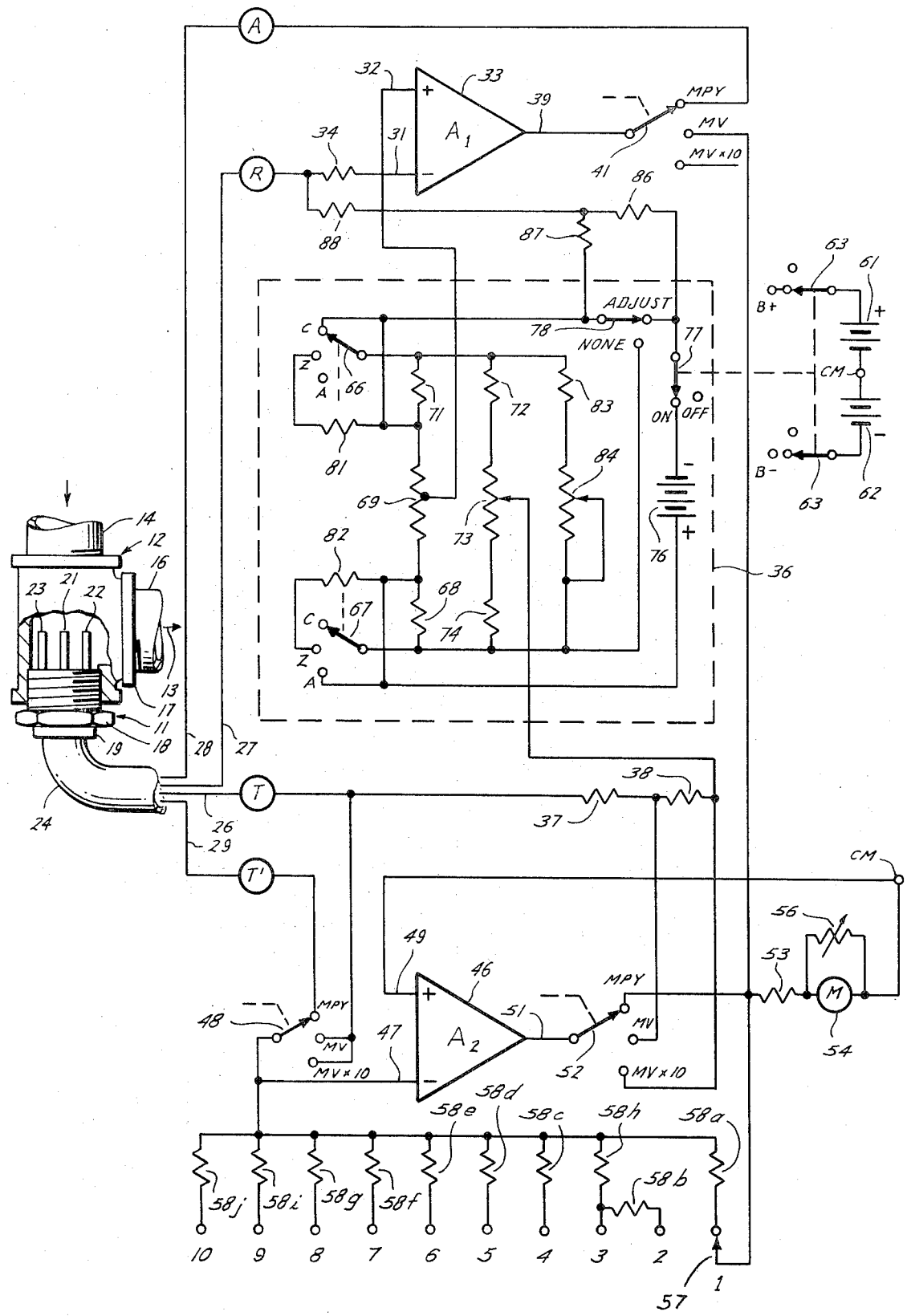

CORROSION RATEMETER

BACKGROUND OF THE INVENTION

1. Field of the Invention

This invention relates to measuring and testing corrosion processes, and it relates particularly to the instruments and electrochemical techniques used in the study of corrosion processes.

2. Description of the Prior Art

It is often desirable to determine the rates at which metals corrode within a corrodant such as a corrosive liquid. For example, corrosion inhibitors are added to aqueous liquids to reduce the corrosion of exposed metals. Instruments are used to measure the rate at which these metals corrode so that the effectiveness of the inhibitor can be determined. The measure of the rate of corrosion upon metals usually involves an instrument associated with a probe carrying electrodes immersed within the corrodant. These instruments are usually termed "corrosion ratemeters." The electrodes in the corrodant undergo certain electrochemical changes that are related to the corrosion of the specimen forming the test electrode. The rate of corrosion can be correlated with the electrochemical effects upon the test (specimen) electrode contacted by the corrodant.

The corrosion of metallic materials by a corrodant causes the dissipation of electrical energy by electrochemical action. For example, two metallic electrodes immersed in a corrodant develop a potential difference as a result of half-cell effects. The potential at a freely corroding test electrode (no external current application) in a dynamic system where the corrosion products are either diffusing or dissolving, eventually reaches a relatively steady-state potential differential relative to a reference electrode. This potential difference may be termed the "freely corroding potential" of the test electrode forming the half-cell subjected to the corrodant. A test electrode, which is subject to corrosion, may be polarized into a non-corroding state by passing direct current from an external source between this electrode and corrodant. The amount of current-induced change in the electrical potential of the test electrode, with respect to a reference electrode, is termed as "polarizing potential." The polarizing potential may be anodic or cathodic, depending upon the directional flow of current which produces the polarization potential. Correlation of the polarization potential increments against the applied current increments may be used to determine the rate of corrosion of the test electrode subject to corrosion action.

An electrochemical process and apparatus, especially useful in measuring corrosion rates, is described in U.S. Pat. No. 3,406,101. In this patent, there is described a corrosion ratemeter which includes a probe having three electrodes adapted to be exposed to a corrodant such as a corrosive liquid, an adjustable current source, an ammeter and a high impedance voltmeter as primary components. The adjustable current source applies a small electric current between a "test" electrode and an "auxiliary" or third electrode. At the same time, the voltmeter monitors the polarization potential produced by current flow between the test electrode and a reference electrode. The current flow slightly polarizes the surface of the test electrode, and as a result, causes a shift in potential (polarization potential) between the test and reference electrodes. The current flow required to produce a certain desired polarization potential (usually about 10 millivolts) is directly proportional to the corrosion rate of the test electrode undergoing corrosion. Usually, the polarization is selected within the linear voltage-corrosion rate environmental conditions, and good results have been obtained with between 5 and 20 millivolts but preferably 10 millivolts, polarization.

If the corrosion rate is low, a very small current flow will polarize the test electrode. If the corrosion rate is high, more current flow is required to polarize the test electrode. The weight of metal lost from the test electrode (by electrochemical corrosion) is directly proportional to the current flow in accordance with Faraday's Law. Thus, by use of appropriate constants and adjustments of the surface area of the test electrode, the ammeter can be calibrated directly into any desired units of corrosion rate providing the surface area of the test electrode exposed to corrosion can be adjusted to the desired range. In order to provide symmetry of the probe, and for other reasons, the exposed surface area of all electrodes is usually made identical. Thus, if the electrodes are constructed identically of the same material, such as 10–20 mild steel, any of the electrodes may serve as the auxiliary, test and reference functions in the electrochemical techniques for determining the rate of corrosion.

In the corrosion ratemeters of the type described in the mentioned patent, the amount of current which flows between the test and third electrodes to produce a certain polarization potential is measured to determine the rate of corrosion occurring at the test electrode. Any potential differences, such as the freely corroding potential, present between the test and reference electrodes, other than the polarizing potential, produce erroneous results in corrosion rate determinations. Obviously, these instruments can produce highly accurate results when a correction is made for the non-polarizing potential differences between these electrodes, principally the freely corroding potential, which may exist between these electrodes before, and also during, application of the polarizing current. Additionally, in these instruments correction for the freely corroding and other potentials must be made without effecting the impedance between the reference and test electrodes immersed within the corrodant. Otherwise, a constant polarizing current will produce corresponding variations in polarization potential to be developed between these electrodes.

Corrosion ratemeters employing controlled current flow for producing a certain polarization potential between electrodes, may employ a manual adjustment to remove the freely corroding potential component from the total potential difference between the test and reference electrodes. As a result, only the polarization potential will be the measure of when the controlled current is at the exact magnitude to provide a correct measurement of corrosion rate occurring at the test electrode. In many instances, the freely corroding potential between the reference and test electrodes would be desired to be measured. Corrosion ratemeters usually employ high gain, differential input amplifiers for sensing the potential between reference and test electrodes. The voltage loop circuitry associated with these amplifiers is such that nearly infinite input impedance exists in their input circuits. The output of these amplifiers during measurement of corrosion rate produces a current flow (from a power source) which passes in a low impedance current loop between the third and test electrodes, through the corrodant and to circuit common of the power source. This current flow produces, with negative feedback, a potential at the test electrode equal to a certain polarization potential (e.g., 5–25 MV's.) under the conditions of measurement. Other circuit means, including amplifiers or readout means, are employed to detect the magnitude of current flow which is correlated to the rate of corrosion attack of the test electorde by the corrodant. In the manual adjustment type of corrosion ratemeters, the freely corroding potential between the reference and test electrode can be removed by applying a correction potential from an adjustable potential source between one input of the differential amplifier and the test electrode. Thus, the same circuitry cannot be employed directly to measure this freely corroding potential. The differential amplifier input could be switched directly to the electrodes by excluding the potential source. Then, the output of this amplifier can drive the current sensing amplifier and readout means. An additional switching function would have to be provided between the inputs of the differential amplifier to maintain the required negative feedback condition for proper measurement of the freely corroding potential.

Switching of the input circuitry of differential input amplifiers having near infinite input impedance (10 megohms and above) and at high circuit gains (50,000 and above) poses severe electrical stability problems. For example, input switching must be under conditions which do not effect the input impedance of the static current balance of the differential input amplifiers. The switching means themselves must not generate false voltage signals through switching contacts which provide resistance-induced electrical noise and impedance variations. These switching means would require a low resistance, low noise electrical system. Such switching systems exist, but are impractical for portable and low cost corrosion ratemeters employing relatively simple circuit arrangements. The same problems exist in switching the other components of the circuit to maintain the proper negative feedback of the differential input amplifiers during measurement of freely corroding potential.

It is the purpose of this invention to provide a portable and relatively simple corrosion ratemeter which has a manual adjustment for removing the freely corroding potential component from the total potential difference between the test and reference electrode at the input of a differential amplifier. In addition, the circuitry of this corrosion ratemeter is so arranged that measurement of the freely corroding potential may be made without switching the input circuitry of high gain amplifiers having extremely high input circuit impedances. All switching required to permit the circuitry to operate for corrosion measurements and also measurement of freely corroding potential occur in low impedance circuits where switching induced voltage (noise) signals cause no significant errors in meausrement. In addition, both types of measurements are made under conditions of a common reference point, circuit common of the power source for the amplifiers so that no corrections for gain variations, line noise, etc., need be made to the amplifiers in performing corrosion rate and freely corroding potential measurements.

SUMMARY OF THE INVENTION

In accordance with one aspect of this invention, the corrosion ratemeter determines the rate of corrosion by means of polarization measurements in the corrodant. The meter comprises a plurality of electrodes adapted to be placed into contact with a corrodant, and these electrodes include a reference electrode, a test specimen electrode, and a third electrode. A differential amplifier connects to a direct current supply means including circuit common. The differential amplifier has a first input connected to the reference electrode and a second input connected through a circuit means to the test specimen electrode, an an output connected through the third electrode. Second amplifier means connect to the test specimen electrode and circuit common for bringing the circuit common to zero potential specimen electrode and for completing a current loop circuit from the output of the differential amplifier, between the third and test specimen electrodes, and circuit common. Readout means measure the output current in the current loop which creates a polarization potential between the reference and test specimen electrodes. In other embodiments of this invention, switching means are employed whereby the described corrosion ratemeter directly measures the freely corroding potential between the reference and test specimen electrodes without any switching of the high impedance input circuitry of the differential amplifier.

BRIEF DESCRIPTION OF THE DRAWING

The figure in the drawing includes a prospective view of an illustrative piping system with a corrosion ratemeter probe carrying a plurality of metallic electrodes interconnected by a cable to one embodiment of a corrosion ratemeter of this invention which is shown by a schematic diagram.

DESCRIPTION OF SPECIFIC EMBODIMENTS

Referring now to the drawing, there is illustrated a probe 11 contained in a piping system 12 which conveys a corrodant, such as an aqueous fluid, in the direction indicated by the arrow 13. The piping system 12 includes a pair of pipes 14 and 16 interconnected by a tee 17 to which the probe 11 is threadedly connected. The probe 11 may be constructed of any suitable form, such as the structure illustrated in U.S. Pat. No. 3,558,462. As illustrated, the probe 11 has a metallic body formed of a pipe plug 18 carrying metal electrodes 21, 22, and 23 electrically isolated from the body. The electrodes are connected by conductors (not shown) within the plug 18 to an electrical connector 19. A cable 24 connects at one end to the connector 19 of the probe 11 to provide distance-spanning electrical interconnection to circuitry of the corrosion ratemeter shown in the right-hand portion of the drawing. More particularly, the cable 24 contains electrical conductors 26, 27, 28 and 29. The electrodes 21, 22 and 23 are connected to conductors 26, 27 and 28, respectively. In addition, the conductor 29 also connects to the electorde 21 to provide a separate current path to the circuit terminal T′ of the circuitry of the corrosion ratemeter.

Preferably, the electrodes 21, 22 and 23 are structurally identical for purposes of the present electrochemical technique. For purposes of the present description, the electrodes 21, 22 and 23 provide "test", "reference", and "auxiliary" or "third electrode" functions, respectively. The electrode 21 for the precise determination of corrosion rate of a certain steel, should be made of this certain steel. Although the electrodes will usually be metallic, they can be formed of any substance capable of placing ions into solution in a corrodant. It will be apparent that the probe 11 may carry any number of electrodes which by proper switching and electrical connections provide the necessary functions for carrying out the measurement of corrosion rate.

Referring now specifically to the circuitry connected to the cable 24, the corrosion ratemeter of the present invention includes electrodes 21, 22 and 23 on probe 11 interconnected through the conductors 26 through 29. The conductors 26 through 29 interconnect terminals R, T, A and the T' current return of the test electrode 21 of the circuitry. The circuitry includes an input circuit formed of a high impedance voltage loop between the test electrode 21 and the reference electrode 22.

The voltage loop circuit includes the first and second inputs 31 and 32 of a differential input amplifier 33. The reference electrode 22 connects through the conductors 27 and an isolation resistor 34 to the input 31. The test electrode 21 connects through conductor 26 and a potential signal circuit 36 (in chain line outline) to the input 32. In series with the circuit 36 are resistors 37 and 38 whose functions will be described later in the present specification.

The circuit 36 is arranged to provide a source of variable voltage for providing potential signals between the inputs 31 and 32 of the differential amplifier 33. These signals provide for removing from inputs 31 and 32 of the freely corroding potential which is present between the reference and test electrodes as a result of their immersion within the corrodant. In addition, the circuit 36 provides a second potential signal, usually between 5 and 25 millivolts, between inputs 31 and 32. The second potential signal functions in the differential amplifier 33 to produce a current flow in its output 39 which polarizes the test specimen electrode 21 to a certain polarization potential relative to the reference electrode 22. For this purpose, the differential amplifier 33 has the output 39 connected selectively through switch 41 to the third electrode 23 via conductor 29 and through the corrodant to electrode 21. A separate current return to circuit common is provided from the test electrode 21 through conductor 29 to terminal T' of the circuitry. A potential sensing return to input 32 is provided by the conductor 26 which connects to terminal T of the circuitry. Terminal T of the circuitry is connected through resistors 37 and 38 and the circuit 36 to the input 32 of the differential amplifier 33. Thus, any potential changes between the reference and test electrodes appear between the inputs 31 and 32 of the differential amplifier 33, but no current can flow because of the very high impedance in the voltage loop circuit. Until the inputs 32 and 33 are at a zero differential potential, the differential amplifiers 33 produces a change in current flow in its output 39 until the induced polarization potential at the test electrode relative to the reference electrode is the same as provided by the second potential signal from the circuit 36. For example, if the circuit 36 provides a second potential signal of 10 millivolts between inputs 31 and 32, the differential amplifier 33 provides current flow in the output 39 to the test electrode 21 until a 10 millivolts polarization potential difference is induced between the reference and test electrodes. At this time, the inputs 31 and 32 reach a zero potential differential and the differential amplifier 33 is in stable operation with a certain current flow in output 39. As previously described, this current flow is a function of the corrosion occurring at the test electrode 21. The particular current magnitude can be measured, and correlated to the corrosion rate about the exposed surface area of the test electrode. Thus, the magnitude of current flow may be expressed directly in the corrosion attack at the test electrode in mils per year (MPY). With the described circutry, the amplifier has an extremely high common mode rejection characteristic since inputs 31 and 32 are floating with near infinite impedance separation of signals from the output 39.

The differential input amplifier 33 may be of any type, but preferably is arranged to have a circuit gain of above about 20,000 for satisfactory operation in the present corrosion ratemeter. The differential amplifier 33 has the usual connections for receiving operating power from a power source including B+, B−, trim, etc., which terminals are not shown in the drawing for convenience in the description.

The magnitude of current flow between the output 39 of the differential amplifier 33 and the test electrode 21 is measured by using a second amplifier 46. In measurement of corrosion rate, the amplifier 46 has a first input 47 selectively connected through a switch 48 to terminal T' which connects through the conductor 29 to the test electrode 21. This connection is a part of the current loop forming a separate current return from the test electrode through the amplifier 46 to circuit common (CM). The second input 49 of the amplifier 46 connects directly to circuit common forming a voltage inverter. The output 51 of the amplifier 46 connects selectively by a switch 52 through a calibrating resistor 53 and an ammeter 54 (with a shunting calibrating variable resistor 56) to circuit common. The arrangement of the resistors. 53 and 56 with the meter 54 are typically those of a calibrated voltmeter. However, in the present instance, the readings of voltage between the output 51 and circuit common are calibrated in terms of relative currrent magnitudes relating to corrosion attack of the test electrode 21 and can be expressed in mils per year (MPY). The meter 54 may also be calibrated in millivolts (MV). The negative input 47 also connects selectively through a switch 57 and a plurality of range settings resistors 58a − 58j at positions 1 through 10 of the switch 57 to the connection at resistor 53 of the readout means provided by the meter 54. Thus, the range resistors are selected in the feedback arrangement of the amplifier 46 to determine circuit gain and regulate the current flow produced in its output 51 relative to circuit common.

The amplifier 46 serves as a current-to-voltage transducer or converter relative to the current flow from the ouput 39 of the differential amplifier 33 which creates the desired polarization potential at the test electrode 21. In addition, the amplifier 46 serves to bring the inputs 47 and 49 to the same potential by current flow in output 51. Thus, the circuit common is brought to the same potential (zero potential difference) as the input 47 and the terminal T' of the circuitry. The amplifier 46 now completes the current loop return, at zero potential difference, between the terminal T' and circuit common. As a result, extraneous potential signals at conductor 29 do not influence the readout on meter 54. The amplifier 46 also functions to provide a readout of the current flow producing the desired polarization at the test electrode 21.

It will be apparent that the circuit gain of the amplifier 46 is controlled by the setting of the switch 57 to select the proper range resistor 58a–58j which governs the feedback signal to input 47. Since the feedback at the amplifier 46 is inverted relative to the current flow in output 39, the amplifier 33 receives the required negative feedback signal relative to the probe 11 for proper operation. The amplifier 46 may be of any type, but preferable is a differential input amplifier which is connected to a suitable source of power including terminals B+, B–, trim, etc. (not shown) in a conventional fashion. The amplifier 46 should have a circuit gain of above about 20,000 with relatively high input-output signal separation characteristics.

The switches 41, 48 and 52 are preferably arranged mechanically for gang switching in the circuitry. In the present embodiment these switches have a function of a single pole triple-throw arrangement. With these switches in the position shown in the drawing, the circuitry is arranged to measure corrosion rate (MPY) occurring at the test electrode 21. The other positions are utilized for measuring the freely corroding potential between the reference and test electrode in millivolts (MV or MV × 10).

The source of operating potential for the amplifiers 33 and 46 can be any suitable source, but it is illustrated as batteries 61 and 62 which are connected to circuit common (CM) and through a double pole-single throw switch 63 to terminal B+ and B–, respectively. The circuit common connection of the batteries is connected to circuit common in the circuitry of the present embodiment.

The circuit 36 provides an adjustable voltage for applying the first and second potential signals across the inputs of the amplifier 33. Any suitable circuit may be employed for this purpose. However, there is illustrated a resistance bridge network which provides a highly satisfactory source of such "nulling" potential and also "polarization" potential signals to the amplifier 33.

The circuit 36 is comprised of a bridge network which is adapted to provide a first potential signal for nulling the amplifier 33 to remove the freely corroding potential between the reference and test electrodes. In addition, the bridge network provides a second potential signal to calibrate the input of the amplifier 33 so that the current flow in its output 39 will produce at the test specimen electrode a certain polarization potential. This polarization potential usually is 10 millivolts, but it can be any potential within the range of between about 5 and 25 millivolts. In addition, the polarity of the application of this second potential signal may be selected for producing a directional change in the flow of current in the output 39 of the amplifier 33 so that the polarization of the test electrode 21 is either cathodic or anodic.

More particularly, there are provided switches 66 and 67 in the network which are single pole, triple-throw switches so that a function selection may be made between cathodic (C), zeroing or nulling (Z), and anodic (A) functions. The switches 66 and 67 connect across a bridge formed of resistors 68, 69, 71, 72, 73 and 74. The resistor 69 has a center tap which is connected directly to the input 32. The resistor 73 has a variable tap which is connected to the resistor 38 in the potential signal or voltage loop extending to terminal T and conductor 26 and the test electrode 21. Voltage for operating the described resistor network bridge is provided from a battery 76 selectively applied through switches 77 and 78 to the bridge. The switch 77 is preferably connected mechanically for off-on operation with the switch 63 that is associated with the source of power for operating the present corrosion ratemeter. The switch 78 has a first position "Adjust" as shown in the drawing. More particularly, with the switch 78 in the "Adjust" position, the potential of the battery 76 is applied acros the resistor network in such a manner that in a balanced condition the potentials at the center tap of the resistors 69 and 73 provide equal potentials and no current will flow from the resistor network. As a result, the input 32 is at the same potential as the variable tap on the resistor 73. With the switches 66 and 67 in the nulling (Z) position, the adjustable tap on the resistor 73 is adjusted until the meter 54 reads zero output potential. This is the first potential signal that removes the freely corroding potential from inputs 31 and 32. With the switches 66 and 67 in either the cathodic or anodic positions (C or A), resistors 81 and 82 unbalance the bridge by predetermined amount, for example, 10 millivolts, to produce a second signal potential to the inputs of the amplifier 33 of the necessary magnitude to produce the current flow in the output 39 so that the test electrode 21 is induced to the desired polarization potential relative to the reference electrode 22. The precise second signal potential is obtained through a use of a shunting arm in the bridge provided by resistors 83 and 84. It is noted that resistor 84 has a variable tap which shunts a selected portion of the resistance so as to calibrate the current flow through the various arms of the resistor network to produce the exact magnitude of second signal potential applied to the inputs of the amplifier 33. Such calibration may be obtained by replacing the probe 11 with a "meter prover" which is a circuit that provides a simulated input of a corrosion probe reflecting a 10 MPY corrosion rate. Then, the circuitry is adjusted through the use of the resistor 84 so that the meter 54 produces a 10 MPY readout. The range switch 57 can be moved between the ten positions to select the proper range for the meter 54 so that the most accurate readout is obtained. For example, the switch 57 may be moved to the range resistor which provides a full scale reading of 10 MPY on the meter 54 for calibration purposes.

With the switch 78 in the lower position marked "None," no first and second signal potentials are applied to the input of the amplifier 33. Now the amplifier 33 will respond solely to whatever freely corroding potention is present between the reference and test specimen electrodes. However, the output 39 is still connected through switch 41 to the third electrode 23. If the amplifier 33 had an infinite impedance characteristic, there would be no feedback present to the amplifier 33 and no current would flow in either inputs 31 or 32. However, all amplifiers have some small imperfection and therefore a small amount of current could flow under these conditions. For this purpose, the battery 76 provides a small amount of current through the resistors 86 or 87 through an isolating resistor 88 to the resistor 34 in input 31 of the amplifier 33. This current flow is extremely minute, but is just sufficient to counter any current flow unbalance in the inputs of the amplifier 33. Thus, by the injection of a small amount of current into the input 31, the amplifier 33 is brought to a static current balance so that it displays unusually high gain characteristics at substantially zero input current and extremely high common mode rejection type operation.

The circuitry of the present embodiment can also be used in a novel arrangement for measuring the freely corroding potential which exists between the reference and test electrodes. For this purpose, the switch 78 is moved to the "None" position so that no potential signals are applied from the resistance network of the circuitry 36 to the input circuit of the amplifier 33. Thus, the potential difference between the reference and test electrodes passes through the relatively high impedance of various circuit resistors, including resistors 37, 38, 87, 88 and 34. However, no current will flow because of the infinite impedance characteristics of the voltage loop circuit associated with the amplifier 33. The potential differential appears between the inputs 31 and 32. Under these conditions, the amplifier 33 is capable of producing a current flow in its output 39 responsive to these potentials. However, this current flow to the third electrode 23 would change the potential between the reference and test specimen electrodes. Thus, another current loop circuit arrangement must be made in the output circuit of amplifier 33 for measuring the freely corroding potential between the reference and test electrodes. For this purpose, the switches 41, 48 and 52 are moved to one of the millivolt positions. For example, asumme that the switches are placed to the first millivolt position. Now, the output 39 of the amplifier 33 is connected directly by the calibration resistor 53 and the meter 54 to circuit common. In addition, the output 39 also connects through the range resistors 58a–58j to input 47 of the amplifier 46. The switch 48 connects the input 47 to the terminal T which is part of the voltage loop from the test electrode 21. The switch 52 connects the output 51 of the amplifier 46 into a feedback loop through the resistors 37 and 38 with the switch 52 in the millivolt times 10 position with input 47. As a result, the amplifier 46 now serves a unique function in bringing circuit common, presently at the input 49, to the same potential that exists at the terminal T, the test electrode 21 and input 47. Thus, both amplifier 33 and 46 serve in a voltage inverting function and both have negative feedback present on them. The amplifier 46, as has been mentioned, has brought the circuit common to the same potential as the terminal T but without any current flow between the test electrode 21 through conductor 26, the resistors 37, 38 and circuit 36 to the input 32 of amplifier 33. However, the output current from amplifier 39 flows to circuit common through the readout means provided by the meter 54. The amplifier 46 with input 47 being held at circuit common now provides a feedback current through resistor 37, and if also selected the resistor 38 to the input 47. This feedback produces across resistors 37 and/or 38 an equivalent potential to the freely corroding potential which exists between the reference and test electrodes. As a result, the output current from output 39 of amplifier 33 can reach only such magnitude that the feedback through the resistors 37 and/or 38 produces a potential thereacross which is equivalent to the potential between the test and reference electrodes and brings input 31 and 32 to zero potential differential. The magnitude of current flow is read in the readout means 54 in millivolts. Thus, the amplifier 46 has formed a continuation of the voltage loop from the test electrode to the input 31, but at no current flow relative to circuit common since circuit common has been adjusted to the same potential as the test electrode. Adjustment of the range resistor network through the switch 57 allows the meter 54 to be calibrated in millivolts into the desired readout range. The amplifier 46 has been utilized in a novel fashion for enabling the use of the amplifier 33 directly for the measurement of the freely corroding potential between the reference and test electrodes without any current flowing in its input circuit or from the test electrode 21. Also, no switching of the high impedance inputs 31 and 32 is required.

It will be apparent that the circuitry above described when utilized to measure corrosion rate employs the amplifier 46 in a unique function to bring circuit common to the same potential as the test electrode 21 so that the current loop to circuit common is completed from the output of amplifier 39 but at no voltage differential across the inputs of the amplifier 46. In the measurement of freely corroding potential or millivolts present between the reference and test electrodes, the amplifier 46 performs another unique function in that it provides for bringing the common circuit of the instrument to the same potential as the test electrode but without any current flow in the conductor 26 between the test electrode 21 and the input 32 of the amplifier 33. In addition, the amplifier 33 is always presented through functioning of the amplifier 46 with the proper negative feedback to insure stable operation whether measuring corrosion rate at the test electrode or whether measuring the potential difference, commonly termed freely corroding potential between the reference and test electrodes. All of these measurements are employed with the amplifier 33 operating under high gain conditions, at extremely high input impedance which may be termed as infinity, and with a high common mode of rejection between the signals applied to the inputs 31 and 32 and the output 39 of the amplifier 33. Therefore, the present corrosion ratemeter is commonly isolated signalwise from the signals provided by the electrodes of the probe 11. In addition, the same operating conditions for the amplifier 33 are maintained whether it is employed for the measurement of corrosion rate or for the measurement of freely corroding potential at the probe 11.

Various changes and alterations will be apparent to those skilled in the art of the circuitry of the corrosion ratemeter of the present invention. It is intended that such changes and alterations, which do not depart from the spirit of the present invention, be included within the scope of the appended claims. The appended claims define the present invention; the foregoing description is employed for setting forth the present invention embodiments as illustrative of the present invention.

What is claimed is:

1. A meter for determining the rate of corrosion by means of polarization measurements in a corrodant which comprises:

a. a plurality of electrodes adapted to be placed into contact with a corrodant, said electrodes being a reference electrode, a test specimen electrode and a third electrode;

b. a differential input amplifier connected to a direct current supply means including circuit common; said differential input amplifier having a first input connected to said reference electrode and a second input connected through a circuit means to said test specimen electrode; and an output connected to said third electrode;

c. second amplifier connected to said test specimen electrode and circuit common for bringing said circuit common to zero potential difference relative to said test specimen electrode and completing a current loop circuit from said output of said differential input amplifier and between said third and test specimen electrodes, and to said circuit common;

d. readout means to measure the output current in said current loop which creates a polarization potential between said reference and test specimen electrode.

2. The meter of claim 1 wherein said circuit means provides an adjustable source of voltage for applying a potential signal to said second input of said differential input amplifier representative of a certain polarization potential between said reference and test specimen electrodes.

3. The meter of claim 1 wherein said circuit means provides an adjustable source of voltage for selectively applying a potential signal to said second input of said differential input amplifier for removing said inputs of said differential input amplifier the freely corroding potential between said reference and test specimen electrodes and applying a potential signal to said second input representative of a certain polarization potential between said reference and test specimen electrodes.

4. The meter of claim 1 wherein said second amplifier means is a current-to-voltage converter having a first input connected to circuit common, a second input connected to said test specimen electrode and an output connected to said readout means and circuit common with a feedback resistance loop between said second input and said output.

5. The meter of claim 4 wherein said feedback resistance loop is selectively adjustable for calibrating said readout means for magnitudes of corrosion rate relative to a current flow magnitude in said current loop which creates a certain polarization potential between said reference and test specimen electrodes.

6. A meter for determining the rate of corrosion by means of polarization measurements in a corrodant which comprises:

a. a plurality of electrodes adapted to be placed into contact with a corrodant, said electrodes being a reference electrode, a test specimen electrode and a third electrode;

b. a differential input amplifier connected to a direct current supply means including circuit common, said differential input amplifier having a first input connected to said reference electrode and a second input connected through a circuit means to said test specimen electrode, and an output;

c. second amplifier means connected to said test specimen and circuit common for bringing said circuit common to zero potential difference relative to said test specimen electrode;

d. switching means in a first position to connect said output of said differential input amplifier to said third electrode and complete a current loop circuit from said output of said differential input amplifier through said second amplifier to said circuit common, and said switching means in a second position connecting said output of said differential input amplifier to a second amplifier means and connecting a current reversing feedback loop from the output of said second amplifier means to said circuit means; and e. readout means to measure the output current in the current loop which creates a polarization potential between said reference and test specimen electrodes when said switching means is in the first position, and said readout means measuring the potential differencee between said reference and test specimen electrodes when said switching means is in the second position.

7. The meter of claim 6 wherein said circuit means provides an adjustable source of voltage for applying a potential signal to said second input of said differential input amplifier representative of certain polarization potential between said reference and test specimen electrodes.

8. The meter of claim 6 wherein said circuit means provides an adjustable source of voltage for selectively applying a potential signal to said second input of said differential input amplifier for removing said inputs of said differential input amplifier the freely corroding potential between said reference and test specimen electrodes and applying a potential signal to said second input representative of a certain polarization potential between said reference and test specimen electrodes.

9. The meter of claim 6 wherein said second amplifier means is a current-to-voltage converter having a first input connected to circuit common, a second input connected to said test specimen electrode and an output connected to said readout means and circuit common with a feedback resistance loop between said second input and said output.

10. The meter of claim 6 wherein said feedback resistance loop is selectively adjustable for calibrating said readout means for magnitudes of corrosion rate relative to a current flow magnitude in said current loop which creates a certain polarization potential between said reference and test specimen electrodes.

11. A meter for determining the rate of corrosion by means of polarization measurements in a corrodant which comprises:

a. a plurality of electrodes adapted to be placed into contact with a corrodant, said electrodes being a reference electrode, a test specimen electrode, and a third electrode;

b. a differential input amplifier connected to a direct current supply means including a circuit common, said differential amplifier having a first input connected to said reference electrode and a second input connected to said test electrode through a high impedance voltage loop circuit, and an output connected in a current loop circuit to said third and test specimen electrodes;

c. second amplifier means connected to said test specimen electrode and circuit common for bringing said circuit common to zero potential difference relative to said test specimen electrode and completing said current loop to circuit common;

d. said high impedance voltage loop circuit adapted to provide a potential signal at said second input of said differential input amplifier representative of a certain polarization potential from 5 to 25 millivolts between said reference and test specimen electrodes; and e. readout means to measure the output current in said current loop which creates the certain polarization potential between said reference and test specimen electrode.

12. A meter for determining the rate of corrosion by means of polarization measurements in a corrodant which comprises:

a. a plurality of electrodes adapted to be placed into contact with a corrodant, said electrodes being a reference electrode, a test specimen electrode and a third electrode;

b. a voltage loop circuit connecting said reference and test specimen electrodes and a current loop circuit connecting said test specimen and third electrodes;

c. a source of direct current providing a circuit common and a first amplifier means connected to said direct current supply means and having an output;

d. said first amplifier means having an input circuit connected to the voltage loop circuit through a circuit means of nulling and polarization potentials;

e. second amplifier means having an input circuit connected between said test specimen electrode and the circuit common of said direct current source and having an output circuit connected to a readout means when said output of said first amplifier connects to said current loop through said test specimen and third electrodes and circuit common, and said output circuit of said second amplifier being connected to a feedback loop to the input circuit of said second amplifier when said output circuit of said first amplifier connects to said readout means and test specimen electrode whereby a reversal of feedback at said first amplifier is obtained; and f. readout means to measure the output current indicative of corrosion rate in said current loop when said output of said first amplifier connects to said current loop circuit and to measure the potential difference between said reference and test specimen electrodes in the voltage loop circuit connected to the input circuit of said first amplifier when said output of said first amplifier connects to said readout means.

\* \* \* \* \*

UNITED STATES PATENT OFFICE
CERTIFICATE OF CORRECTION

Patent No. 3,766,042                Dated October 16, 1973

Inventor(s) H. M. Wilson

It is certified that error appears in the above-identified patent and that said Letters Patent are hereby corrected as shown below:

Column 4, line 14, for "an" first occurrence, read ---and---;
           line 18, after "zero potential" insert ---difference relative to the---;
           line 61, for "electorde", read ---electrode---;

Column 5, line 46, for "conductor 29", read ---conductor 28---;

Column 8, line 14, for "acros", read ---across---;

Column 9, line 33, for "asumme", read ---assume---;

Column 10, line 5, for "input 31" read ---input 32---;
           lines 45 and 46, "commonly", read -- completely --;

Column 11, line 10, after "amplifier", insert ---means---;
           line 32, after "removing", insert ---from---;

Column 12, line 17, for "differencee", read ---difference---; and
           line 29, after "removing", insert ---from---.

Signed and sealed this 5th day of March 1974.

(SEAL)
Attest:

EDWARD M. FLETCHER, JR.           C. MARSHALL DANN
Attesting Officer                 Commissioner of Patents